United States Patent [19]

van Esdonk et al.

[11] Patent Number: 4,730,196

[45] Date of Patent: Mar. 8, 1988

[54] INK-JET PRINTER

[75] Inventors: Johannes van Esdonk, Eindhoven, Netherlands; Michael Döring, Hamburg; Jan Roulaux, Kirchen-Frensburg, both of Fed. Rep. of Germany

[73] Assignee: U.S. Philips Corporation, New York, N.Y.

[21] Appl. No.: 31,220

[22] Filed: Mar. 26, 1987

Related U.S. Application Data

[63] Continuation of Ser. No. 880,400, Jun. 30, 1986, abandoned.

[30] Foreign Application Priority Data

Jul. 1, 1985 [NL] Netherlands ........................ 8501881

[51] Int. Cl.[4] ........................... G01D 15/18; B41J 3/04

[52] U.S. Cl. ............................................ 346/140 R

[58] Field of Search ......................................... 346/140

[56] References Cited

U.S. PATENT DOCUMENTS

| | | | |
|---|---|---|---|
| 4,229,751 | 10/1980 | Tamai | 346/140 |
| 4,353,078 | 10/1982 | Lee | 346/140 |
| 4,424,521 | 1/1984 | Lewis | 346/140 |
| 4,425,777 | 1/1984 | Jeglinski | 72/325 |
| 4,434,350 | 2/1984 | Flisikowski | 219/121 LC |

*Primary Examiner*—Joseph W. Hartary

*Attorney, Agent, or Firm*—Robert T. Mayer

[57] ABSTRACT

The ink-jet printer contains an ink-jet nozzle (1) connected to a pressure chamber (5) which is recessed in a body (7) and is covered with a diaphragm (13, 15) on which a driving element (17) is fitted. The diaphragm contains an outer plate (13) on which the driving element (17) is fitted and an inner plate (15) provided with an oblong opening (19) which extends between the pressure chamber (5) and the ink-feed channel (11). The opening (19) forms a narrow passage with very accurately defined dimensions between the ink-feed channel (11) and the pressure chamber (5).

1 Claim, 2 Drawing Figures

INK-JET PRINTER

This is a continuation of application Ser. No. 880,400 filed June 30, 1986 now abandoned.

The invention relates to an ink-jet printer containing at least one ink-jet nozzle connected to a pressure chamber which is recessed in a body and is covered with a diaphragm on which a driving element is fitted, said pressure chamber being in communication via a narrow passage with an ink-feed channel recessed in the body.

An ink-jet printer of this kind is known for example from U.S. Pat. No. 4,434,350. The driving element may consist of a plate of piezo-electric material which deforms when an electric voltage pulse is applied to it so that a pressure wave is propagated from the pressure chamber by the ink which, via an ink-drain channel, reaches the ink-jet nozzle resulting in the ejection of a drop of ink. To replace the ejected ink, fresh ink then flows from the ink-feed channel into the pressure chamber via a narrow passage, which prevents the pressure wave propagating in the direction of the ink-feed channel.

In the known ink-jet printer the pressure chamber, the ink-feed channel and the narrow passage are formed in the body for example by stamping or by spark erosion. The narrow passage is difficult to fabricate in this manner because of its small dimensions and the high precision that is required. Consequently, expensive tools are needed and the operation has to be performed with high accuracy.

It is an object of the invention to improve an ink-jet printer of the kind mentioned in the preamble in such a way that the fabrication of the narrow passages can be performed without great trouble with the required accuracy. The ink-jet printer in accordance with the invention is characterized in that the diaphragm comprises two plates one above the other, namely an outer plate, on which the driving elements are fitted, and an inner plate, which contains oblong openings each of which extends between one of the pressure chambers and one of the ink-feed channels, said openings forming the narrow passages.

The dimensions of the narrow passages are determined in this construction by the thickness of the inner plate and the width of the openings made therein. Plates with an accurately determined thickness are in general readily obtainable and the openings therein can be made with a very accurately defined width, for example by etching or by spark erosion.

Figure 1:
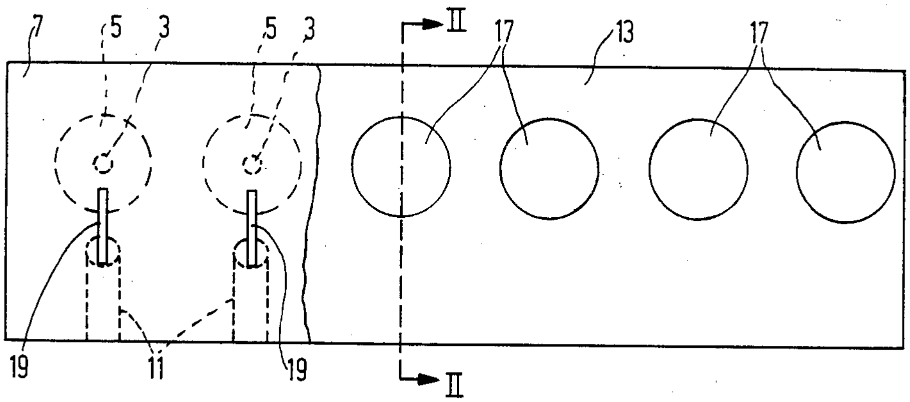
Figure 2:
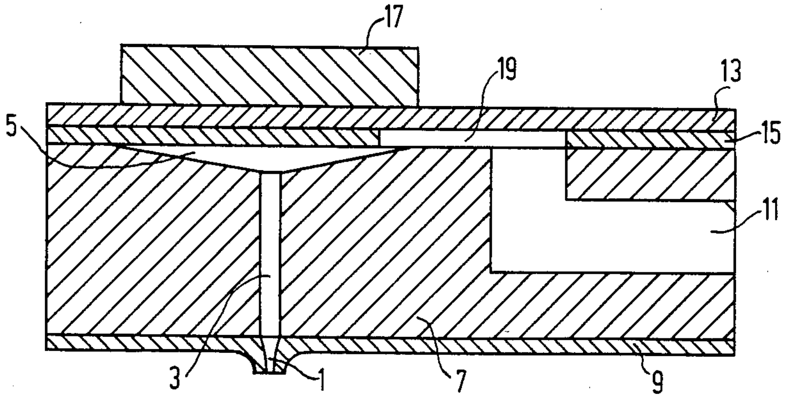

Further details of the invention will now be explained with reference to the drawings, in which FIG. 1 shows a plan view of an embodiment of a printing head with six ink-jet nozzles for an ink-jet printer in accordance with the invention, and FIG. 2 shows a lateral cross-section on an enlarged scale taken along lines II—II in FIG. 1.

The printing head shown in FIGS. 1 and 2 for an ink-jet printer contains six ink-jet nozzles, such as 1 in FIG. 2 which, in this embodiment, are arranged in a row. Characters in matrix print can be formed by displacing the printing head during printing at right angles to the direction of the row. Other embodiments of printing heads, for example with only one ink-jet nozzle or with four rows each with six ink-jet nozzles, are also possible. Each ink-jet nozzle 1 is connected via an ink-drain channel 3 to a pressure chamber 5 which is recessed in a body 7, preferably made of metal. The pressure chamber 5 can be produced for example by pressing a stamping plunger into the material of the body 7. Another possibility is to form the pressure chambers 5 by spark erosion in the body 7. The ink-drain channels 3 can be formed by drilling into the body 7 and the ink-jet nozzels 2 can be formed in a nozzle plate 9 fixed against the body, as described for example in DE-A No. 3,042,483 to which U.S. Pat. No. 4,425,777 corresponds. Also formed in the body 7 are ink-feed channels 11, which for example may likewise be drilled. In the illustrated embodiment each pressure chamber 5 has a separate ink-feed channel 11, which opens on a side face (the right side-face in FIG. 2) of the body 7. All ink-feed channels can be connected with an ink reservoir via an ink-feed supply system placed against this side face (not shown in the drawing). It is also possible to drill the ink-feed supply system into the body 7.

The pressure chambers 5 are covered with a diaphragm which consists of two plates one above the other, namely an outer plate 13 and an inner plate 15. The inner plate 15 is formed for example from nickel with a thickness of 0.05 mm, and the outer plate may be formed from chrome nickel steel with the same thickness. In FIG. 1 the left part of the outer plate 13 is broken off and the pressure chambers 5 and ink-feed channels 11 located under that part of the inner plate 15 are shown with dashed lines. On the outer plate 13, at the location of each pressure chamber 5 a driving element 17 is present, which consists for example of a plate of piezo-electric material with electrodes (not shown). The driving element 17 can be fixed to the plate 13 by means of a suitable adhesive. The inner plate 15 is provided with oblong openings 19, for example by etching or by spark erosion. The width of these openings may for example be equal to the thickness of the inner plate 15. Each opening 19 extends between one of the pressure chambers 5 and one of the ink-feed channels 11 and thus forms a narrow passage (capillary connection) from the ink-feed channel to the pressure chamber. The plates 13 and 15 may be connected together and to the body 7 by means of for example diffusion welding, as described in German patent application No. 3,242,283 to which U.S. patent application Ser. No. 552,581 filed 11-16-83 now abandoned corresponds.

When one of the driving elements 17 is energized by the application of a voltage pulse to the electrodes, this element deflects and thereby causes a pressure wave in the ink-filled pressure chamber 5. This pressure wave cannot escape through the narrow passage formed by the opening 19 and therefore propagates through the ink-drain channel 3 to the ink-jet nozzle 1, which consequently ejects a drop of ink. When the driving element 17 has returned to its rest state, the volume of the pressure chamber 5 increases, so that ink is sucked in from the ink-feed channel 11 via the narrow passage 19, whereupon the device is ready to eject the next drop of ink. It will be evident that high demands are made on the accuracy of the dimensions of the narrow passage 19. On the one hand, this passage must have the highest possible flow resistance in order that the pressure wave cannot escape towards the ink-feed channel 11, and on the other hand, after ejection of an ink drop the stock of ink in the pressure chamber 5 must be very quickly replenished via this passage in order to minimize the waiting time between the ejection of successive drops of ink. When the narrow passage as described consists of an oblong opening 19 formed in the inner plate 15 these requirements can be met without much difficulty. The thickness of the plate 15 determines the height of the opening 19, and it is possible to fabricate plates with a very accurately defined thickness. The width of the opening 19 can likewise be very accurately defined during the forming of this opening for example by etching or spark erosion.

What is claimed is:

1. An ink-jet printer including at least one ink-jet nozzle, a body with a pressure chamber recessed therein, an ink drain channel connecting said nozzle to said pressure chamber, an ink feed channel, a narrow passage connecting said pressure chamber to said ink feed channel, a diaphragm covering said pressure chamber and a driving element fitted over said diaphragm wherein said diaphragm comprises two plates one above the other, namely an outer plate on which the driving element is fitted, and an inner plate provided with an oblong opening which extends between the pressure chamber and the ink feed channel, said opening forming the narrow passage.

* * * * *